United States Patent [19]

Hisatake et al.

[11] Patent Number: 4,932,342

[45] Date of Patent: Jun. 12, 1990

[54] EMBROIDERING SYSTEM

[75] Inventors: Michio Hisatake; Takeshi Kongo; Hidenori Sasako, all of Tokyo, Japan

[73] Assignee: Janome Sewing Machine Industry Co., Ltd., Tokyo, Japan

[21] Appl. No.: 397,589

[22] Filed: Aug. 23, 1989

[30] Foreign Application Priority Data

Aug. 26, 1988 [JP] Japan ................................ 63-210515

[51] Int. Cl.⁵ ...................... D05B 21/00; D05B 25/00; D05C 7/00
[52] U.S. Cl. ............................... 112/103; 112/121.12; 112/155; 112/454
[58] Field of Search ............... 112/103, 102, 155, 454, 112/121.12, 121.11, 262.3, 266.1, 78, 86, 98

[56] References Cited

U.S. PATENT DOCUMENTS 4,369,722  1/1983  Nishida et al. ........................ 112/103
4,557,207 12/1985  Turner et al. ............... 112/121.12 X
4,635,574  1/1987  Fujita et al. ........................... 112/155
4,742,786  5/1988  Hashimoto et al. ............ 112/121.12

Primary Examiner—Peter Nerbun
Attorney, Agent, or Firm—Dann, Dorfman, Herrell and Skillman

[57] ABSTRACT

An embroidering system comprises a plurality of embroidering machine each connectable to a single control unit. Various characters or patterns are stored in a floppy disc installed in the contol unit, from which pattern data designating a desired pattern combination can be read out and transferred to a memory in the control unit responsive to key entry operation. By repeated key entry operation, plural series of stitch control data including the pattern data are in a lump stored in the memory. Among them, a specific series of the stitch control data can be read out in response to a pattern renewal signal which is generated by manual depression of a corresponding key arranged on the embroidering machine each time when the preceding embroidering operation has been completed.

4 Claims, 9 Drawing Sheets

FIG.6
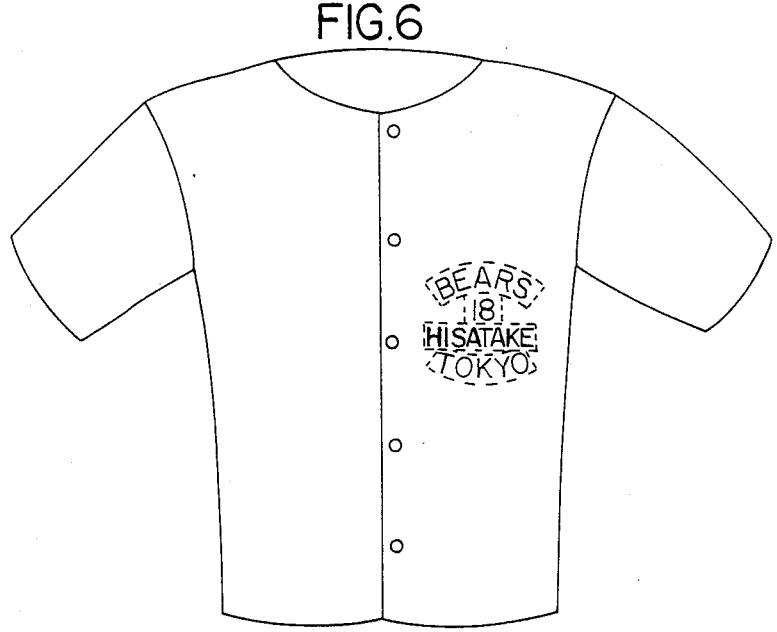
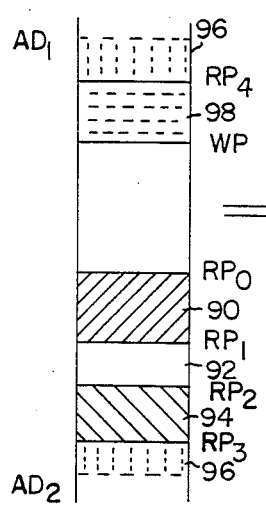
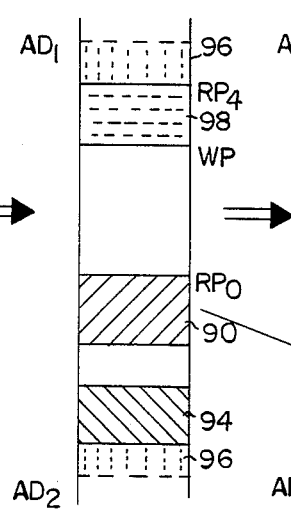
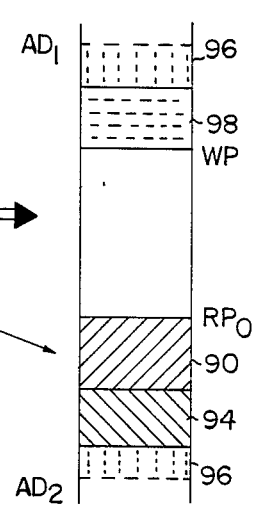
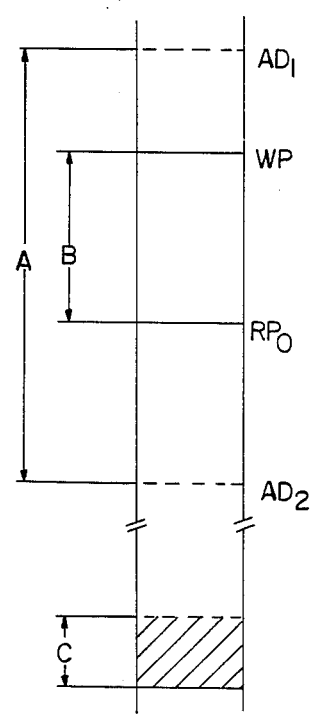

EMBROIDERING SYSTEM

BACKGROUND OF THE INVENTION

This invention relates to an embroidering system comprising one or more of embroidering machines connectable to a single control unit adapted to electronically control operation of the embroidering machines in an independent manner.

In recent years such systematic arrangement for producing embroidery stitches on a fabric has been remarkably developed along with electronization of ordinary sewing machines. The control unit includes a memory capable of storing data necessary to produce a number of different patterns of embroidery stitches on the fabric which is supported and stretched within an embroidery frame mounted on the machine deck. When several pattern combinations of embroidery stitches are to be sequentially produced by the respective embroidering machines connected to the control unit, the operator will manipulate key arrangements on the control unit to select the stitch control data and register the same in the memory. The stitch control data thus stored is read out from the memory and transferred to the embroidering machines each time one sequential set of the selected pattern combinations has been produced on the fabric. This manner of operation will require the operator to keep constant watch on the embroidering machine conditions, and once stitching operation of one sequential pattern combination is over, he must come to the control unit so that the stitch control data of another pattern combination to be next produced will be transferred to the embroidering machines. Moreover, the operator will also be required to take care not to transfer the stitch control data which is over-sized rather than data corresponding to the maximum stitchable area of the embroidering machines to which the said data are to be transferred.

Another approach is to transfer several sets of embroidering stitch control data to the embroidering machines, among which the operator can sequentially select as desired by key manipulation at the embroidering machines This will require a large capacity memory in the respective embroidering machines, increasing costs and impairing space-availability.

SUMMARY OF THE INVENTION

It is therefore an object of the invention to provide a novel embroidering system which could obviate disadvantages of the conventional one.

Another object of the invention is to provide a novel embroidering system wherein an operator is free from frequent round move between a control unit and embroidering machines during embroidering operation, thereby improving working efficiency.

In accordance with an aspect of the invention, an embroidering system comprises a control unit, a plurality of embroidering machines and coupling means for electrically connecting the embroidering machines to the control unit and providing signal transmission lines therebetween. Each embroidering machine has a stitch forming mechanism including a needle, first drive means for vertically reciprocating the needle, an embroidery frame for supporting a workpiece and second drive means for shifting the embroidery frame in relation to the needle to regulate a needle dropping point in the workpiece. The machine also includes first control means typically comprising a CPU for controlling operation of the machine, first memory means adapted to store data required for producing an embroidery pattern combination under specific stitch conditions, and first manual operating means or a keyboard operated to read out data stored in the first memory means under control by the first control means, thereby actuating the first and second drive means to produce the embroidery pattern combination on the workpiece. The machine is also provided with means which is manually operated to generate a pattern renewal signal when one embroidery pattern combination has been produced by the machine.

The control unit comprises second control means typically consisting of a CPU for controlling operation of the unit, second memory means in which a plurality of stitchable embroidery patterns are stored in advance as pattern data, second manual operating means or a keyboard operated to designate a series of stitch control data necessary for producing a desired embroidery pattern combination and third memory means adapted to store plural series of the stitch control data designated by the second manual manipulating means. Each series of the stitch control data including the pattern data designating the respective patterns in the pattern combination, stitch condition data designating conditions on which the pattern combination is produced on the workpiece and transfer condition data designating the embroidering machine or machines to be driven to produce the pattern combination. The second control means in the control unit is operated in response to the pattern renewal signal supplied from a specific embroidery machine to read out a specific series of the stitch control data stored in the third memory means, including the transfer condition data designating the said embroidering machine, and transfer the said stitch control data to the first memory in the said embroidering machine. The control unit is also provided with means for registering one or more of embroidering machines which is actually powered and connected to the control unit as a transferrable machine or machines, and the control means is so operated that data is not transferred to a non-transferrable machine even if the machine generates the pattern renewal signal. Another registration means may be provided for registering size data of each transferrable machine representing the maximum stitchable area thereof, and if the stitch control data to be transferred includes the stitch condition data for producing the pattern combination of a size larger than the maximum stitchable area of a transferrable machine, the control unit is so operated that data is not transferred to the said machine.

BRIEF DESCRIPTION OF DRAWINGS

Further objects and advantages of the invention can be fully understood from the following detailed description when read in conjunction with the accompanying drawings in which:

FIG. 6 is a diagrammatic view illustrating an example of embroidery pattern combinations applied on a baseball uniform;

FIGS. 7a-7c represent, showing in sequence, removal of certain data and a position shift of other data;

FIG. 7d is a further representation of memory storage areas;

DESCRIPTION OF PREFERRED EMBODIMENT

Figure 1:
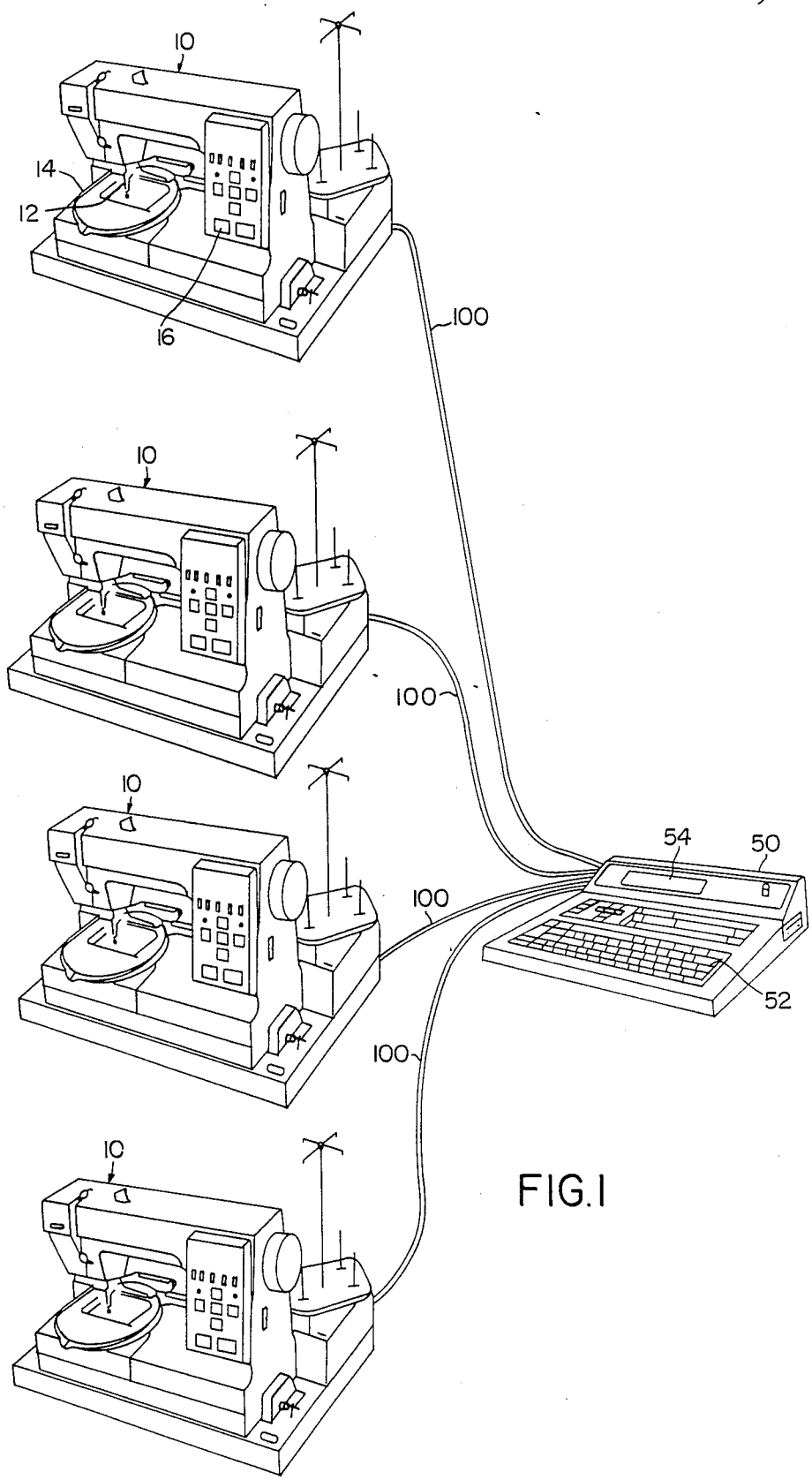
FIG. 1 is an oblique view illustrating a general construction of an embroidering system embodying the invention.

As shown in FIG. 1, an embroidering system embodying the invention includes a plurality of embroidering machines, each connectable via a cable 100 to a single control unit 50. In this embodiment the respective embroidering machines are of the same type but it is to be understood that different types of machines can be employed and connected to the control unit 50.

Figure 2:
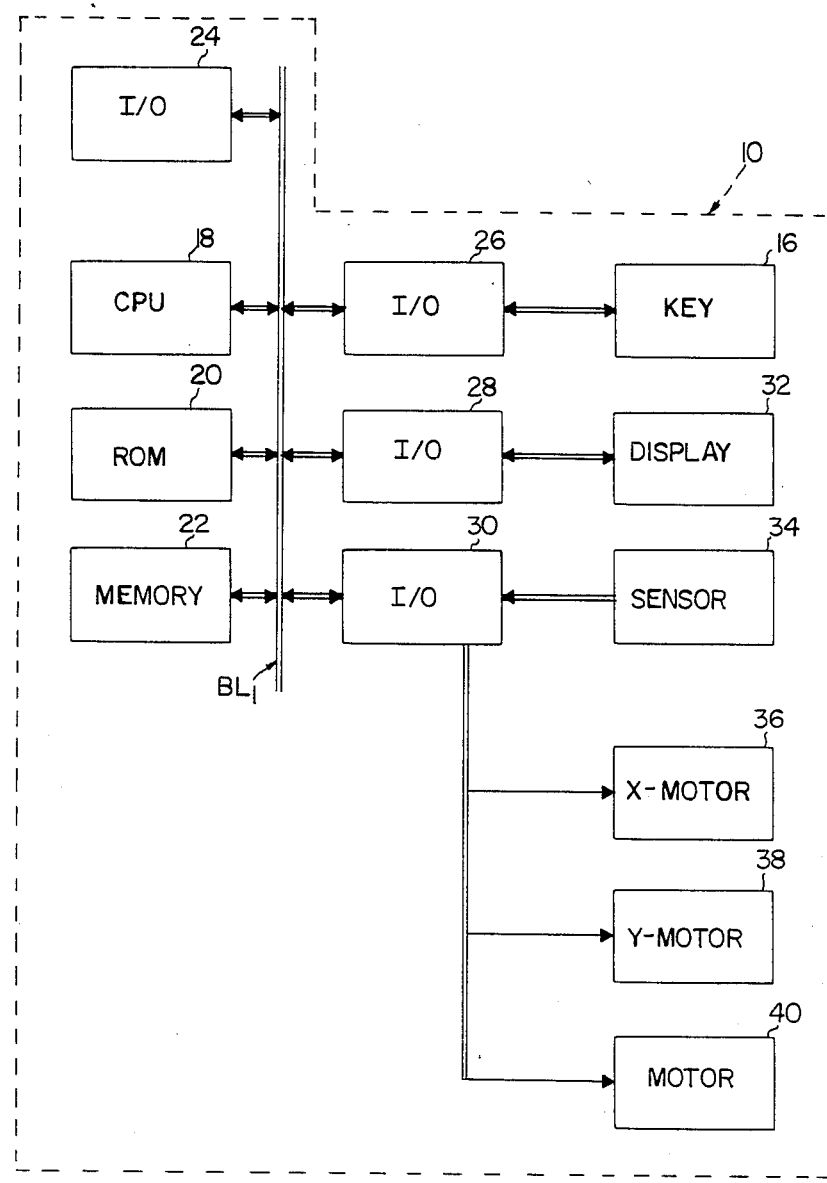
FIG. 2 is a block diagram illustrating an arrangement of an embroidering machine of the system.

As specifically illustrated in FIG. 2, each embroidering machine 10 includes a CPU (central processing unit) 18 which is connected via a data bus $BL_1$ to memories and I/O interfaces for bidirectional data transfer therebetween.

Control programs for controlling operation of the embroidering machines are stored in a ROM 20. A memory 22 stores stitch control data transferred from control unit 50.

I/O interface 24 is operated to receive stitch control data transferred from control unit 50 and, in turn, transfer data representing the status of embroidering machine 10 (hereinunder called simply as status data) to control unit 50. I/O interfaces 26, 28 and 30 transceive data between CPU 18 and various instruments including a keyboard 16, a display 32, sensor means 34 and motors 36, 38 and 40. These instruments are themselves substantially of conventional types and only brief explanations thereof will therefore be given hereunder.

Keyboard 16 is arranged on a front panel of embroidering machine (FIG. 1) and manipulated as desired by a machine operator to perform embroidering operation by the machine. Keyboard 16 typically includes a start key for driving the machine to start the embroidering operation and a stop key for stopping the machine operation. Display 32 consisting of light emitting diode (LED) matrix or liquid crystal device (LCD), for example, is also arranged in a visible section of the embroidering machine (though not shown in FIG. 1) to let the operator to easily understand the present status of the machine. Sensor means 34 includes, as known, a needle position detector, an upper thread break detector, an embroidering frame position detector, etc. from which detection signals are generated for controlling the machine operation. Motors 36 and 38 are driven to move in perpendicular two directions (X and Y directions) an embroidering frame 14 (FIG. 1) mounted on a machine bed to a given position with respect to a vertically reciprocating needle 12 (FIG. 1). Another motor 40 is driven to move needle 12 and interacting members to produce a stitch on a fabric each time when the needle penetrates the fabric.

Figure 3:
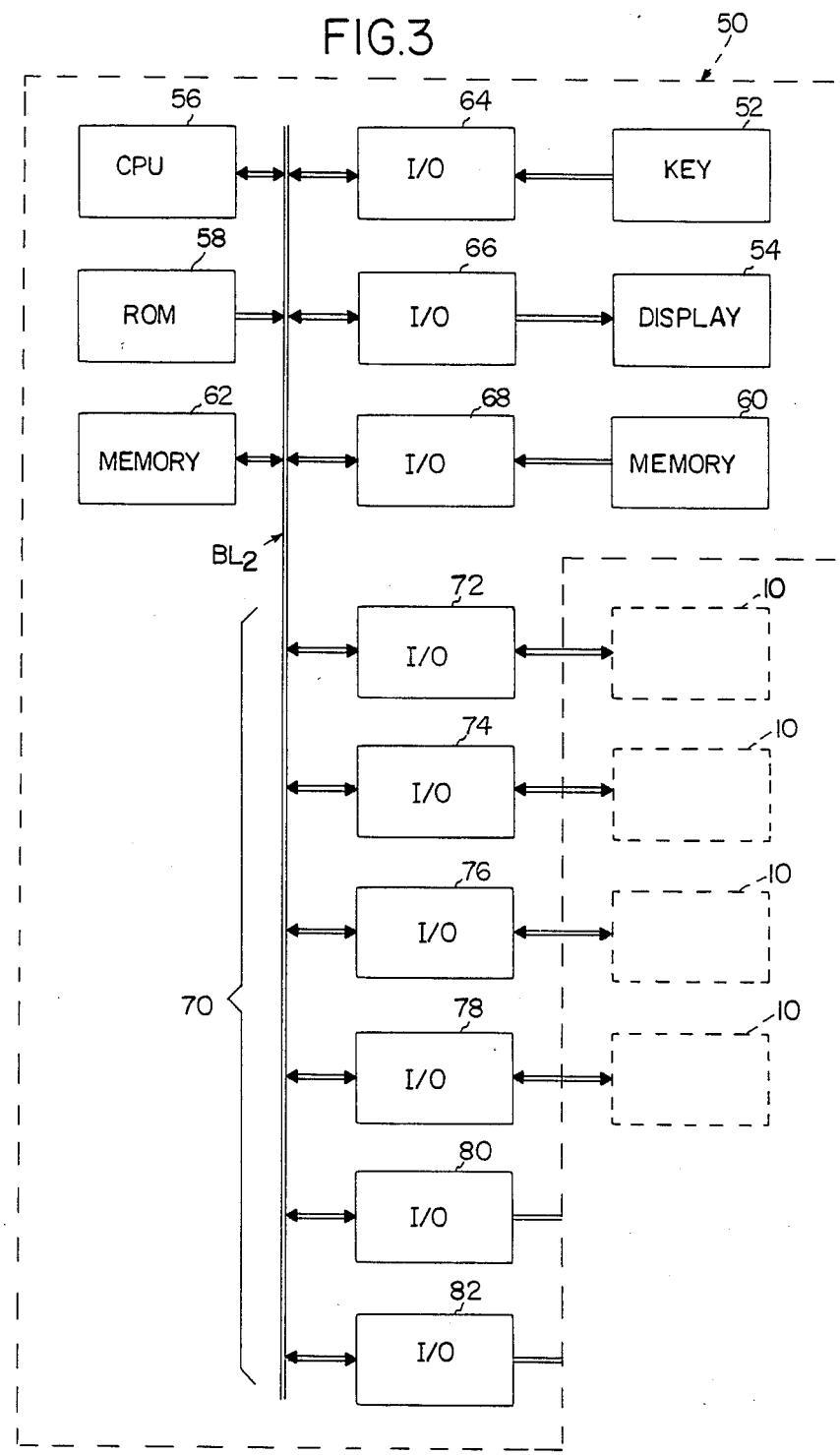
FIG. 3 is a block diagram illustrating an arrangement of a control unit of the system.

Control unit 50 has electric and electronic construction as shown in FIG. 3. In control unit 50, another CPU 36 is provided to make bidirectional data transfer via a data bus $BL_2$. Control programs for controlling operation of unit 50 are stored in a ROM 58. I/O interfaces 64, 66 and 68 are to transceive data between CPU 36 and various instruments including a keyboard 52, a display 54 and memories 60 and 62.

Keyboard 52 is arranged on a front panel of control unit 50 (FIG. 1) to be manipulated by the operator to control operation of the unit. Memory 60 comprises, for example, a flexible floppy disc storing a plurality of embroidery pattern data including alphabetical characters, Arabic and/or Roman numerals and various ornamental patterns. A desired combination of embroidery patterns to be produced in series by embroidering machine 10 may be selected by manipulation of keyboard 52 and read out from memory 60 to be transferred to another memory 62 and temporarily stored therein. The pattern combination stored on memory 62 may be visually confirmed by an information picture plotted in display 54. Different from the, construction in the illustrated embodiment, two CPUs 18 and 36 may be integrated into a single CPU which is arranged in one of the embroidering machines.

Figure 4:
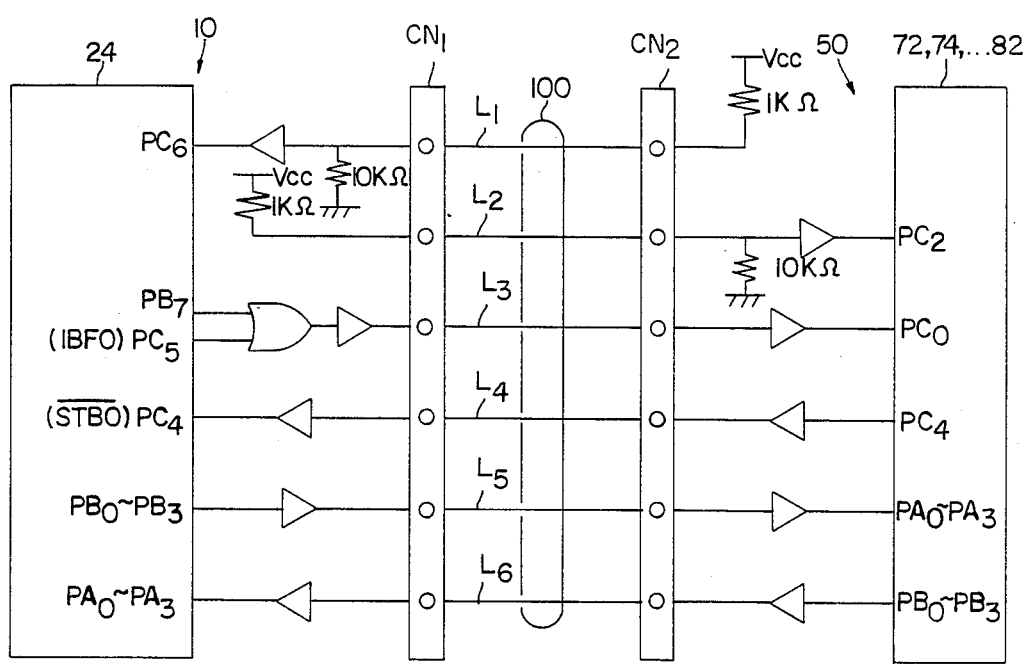
FIG. 4 is an explanatory view illustrating a manner of coupling between the embroidering machine and the control unit.

Communicating means 70 comprises a plurality of I/O interfaces 72, 74, 76, 78, 80 and 82 for making data communication between the respective embroidering machines 10 and control unit 50. For example, I/O interfaces will transfer the stitch control data of the selected pattern combination stored in memory 62 to memory 22 in the embroidering machine by which the said pattern combination is to be produced, and in turn receive the status signal from the respective embroidering machines. More particularly, data will be transceived between embroidering machine 10 and control unit 50 in a manner shown in FIG. 4 wherein cable 100 is coupled between connectors $CN_1$ and $CN_2$ to electrically connect embroidering machine 10 to control unit 50. Among signal lines thus provided, signal lines $L_1$ and $L_2$ are used to detect if the embroidering machine is connected to control unit via cable 100 and also detect if the control unit is powered. The stitch control data stored in memory 62 of control unit 50 will be transferred as a 4-bit data via a signal line $L_6$, whereas the status signal will be transferred from the embroidering machine 10 as a 4-bit data via a signal line $L_5$. Signal lines $L_3$ and $L_4$ are used to send timing signals for the signals transferred through signal lines $L_5$ and $L_6$. Although a parallel communication system is employed in this embodiment, it is noted that a bidirectional serial communication system such as so-called local area network (LAN) can also be useful in application on of this invention.

Figure 5:
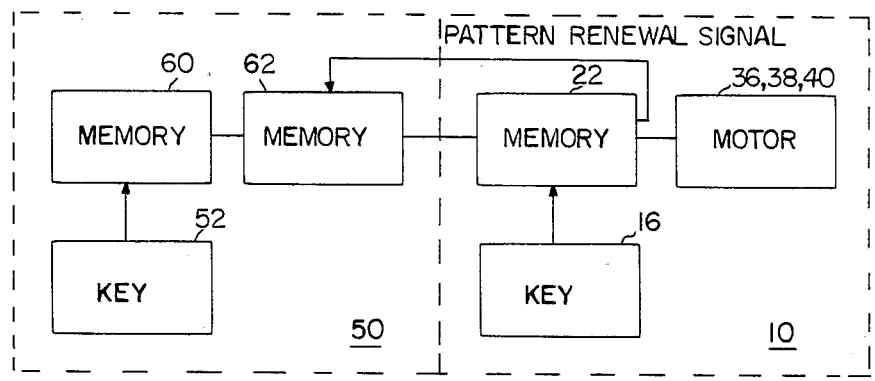
FIG. 5 is a block diagram illustrating a manner of data transfer from the control unit to the embroidering machine.

FIG. 5 illustrates a manner in which embroidery patterns originally stored in floppy disc 60 installed in control unit 50 may be produced on the fabric by embroidering machine 10. More specifically, by the operator's manipulation of keyboard 52, plural series of stitch control data of embroidery pattern combinations to be produced by the plural embroidering machines 10 are in a lump transferred from floppy disc 60 to memory 62 and stored in the latter. Each series of stitch control data comprises: (i) embroidery pattern data designating one or more of embroidery patterns to be produced in series; (ii) stitch condition data designating conditions under which the patterns are to be actually produced on the fabric, which includes arrangement data (which designates that the patterns are to be produced in a straight arrangement or in an arcuate arrangement, for example), character size data, character interval data and stitch pitch data; and (iii) transfer condition data designating the receiving machine or machines to which the data are to be transferred for producing the patterns thereby and counter data designating the number of times of the data transfer. Each series of the stitch control data stored in memory 62 will be transferred to memory 22 in embroidering machine 10, in response to a pattern renewal signal generated from the embroidering machine 10 by manual operation of a pattern renewal key arranged on keyboard 16. The pattern renewal key is operated each time when one series of the pattern combination has been produced by the machine, whereupon another series of stitch control data stored in memory 62 for producing the pattern combination to be next produced by the said machine will be transferred to memory 22. The stitch control data thus stored in memory 22 can be read out therefrom by the operator's depression of the start key also arranged on keyboard 16 so that motors 36, 38 and 40 are driven under control to produce the selected series of embroidery patterns in the designated stitch conditions.

It is to be understood that provision of the pattern renewal key will enlarge function and availability of the system. For example, where first to third series of stitch control data for producing three different pattern combinations in order have been stored in memory 62, should the operator desire that the third series pattern combination be produced next to the first series pattern combination while skipping the second series, such program change can easily be done by depressing twice the pattern renewal key after the first series has been completed, followed by depression of the start key. If the pattern should have been produced on the fabric out of order, a repairing process may be carried out automatically or manually without depression of the pattern renewal key.

FIG. 6 illustrates an example of application of the invention wherein a baseball team name of "BEARS", a player's number of "18", a player's name of "HISATAKE" and a city identification of "TOKYO" are embroidered on the team's uniform, in which case the respective four embroidery pattern combinations will be produced based on the respective series of the stitch control data. For example the first pattern combination "BEARS" are produced based on the stitch control data comprising embroidery pattern data designating alphabetical characters "B","E","A","R" and "S" in this order, stitch condition data including arrangement data which governs that this pattern of five characters be produced in an arcuate arrangement, and transfer condition data designating embroidering machine or machines by which this pattern is to be produced.

Memory 62 in control unit 50 may store plural series of stitch control data in a manner shown in FIG. 7, by way of example. In this example, five series of stitch control data are stored in a memory area A allocated between predetermined addresses $AD_1$ and $AD_2$ in memory 62, among which data. In a hatched area 90 is stored at first and data in a dotted area 98 is the latest one. WP represents a writing pointer used to newly write data in a blank area B and $RP_0$ to $RP_4$ represent reading pointers for the respective data stored in areas 90 to 98. Supposed that data in area 92 is now read out from memory 62 in reference to its reading pointer $RP_1$, the older data, that is data in area 90 is shifted toward the later data in area 94 to enlarge the blank area B. Thus, memory 62 always includes the blank area B between the writing pointer WP and the first reading pointer $RP_0$ into which fresh stitch control data can be stored. Memory 62 also includes another area C apart from the memory area A and the blank area B, in which selected stitch control data can be registered in a manner described later.

Figure 8:
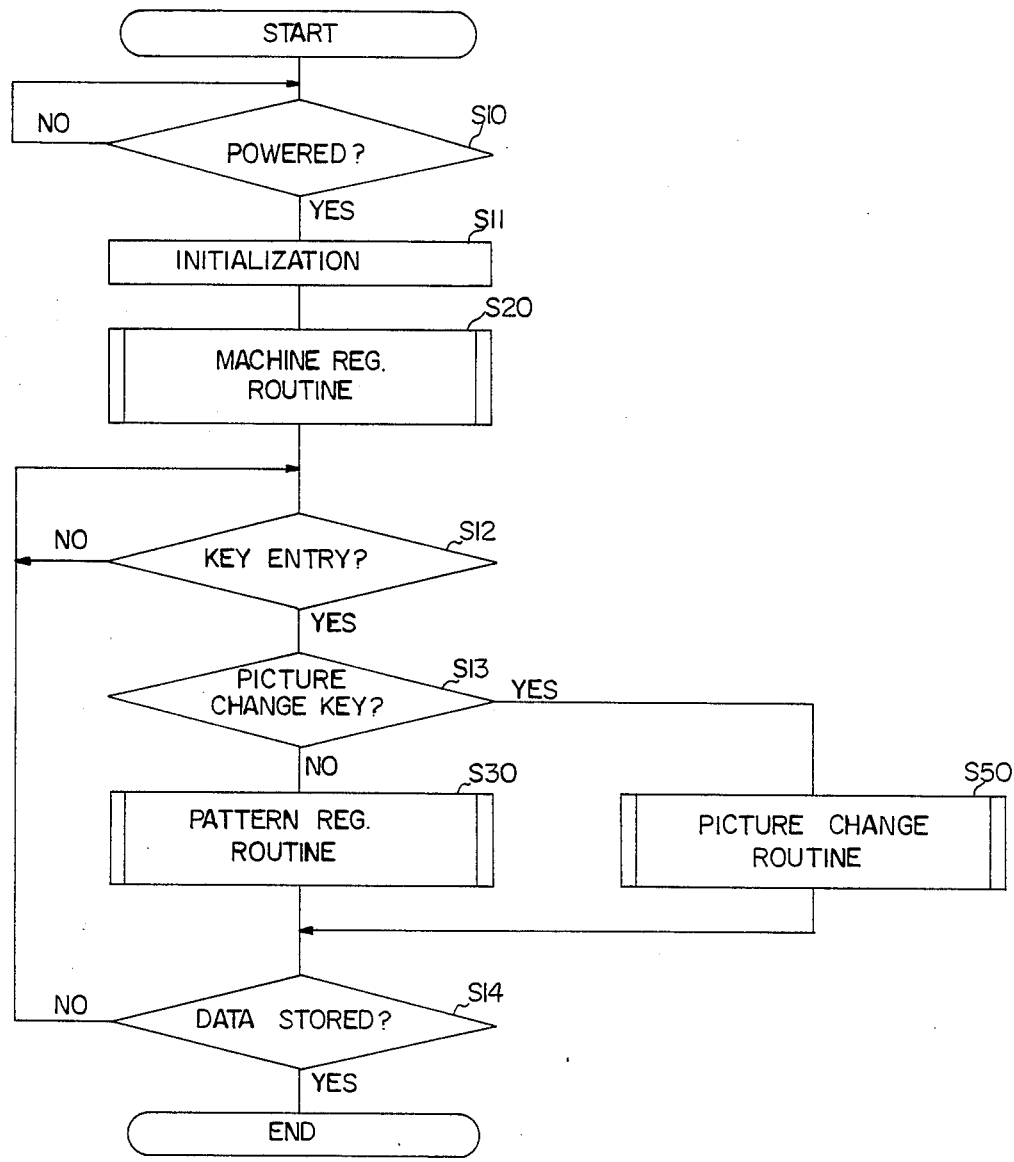
FIG. 8 is a flow chart illustrating a main routine processed by the control unit.

Reference is now made to the flow chart shown in FIG. 8 to explain the control operation governed by control unit 50.

The control operation starts with step S10 (referred to simply as S10, as for other steps) which goes to S11 when control unit 50 is powered. S11 carries out initialization of flags and relevant instruments necessary to make operative the control unit 50. Then in S20, machine registration routine is carried out in a manner described later in reference to the flow chart shown in FIG. 9. In this routine, data regarding machines to which the stitch control data in memory 62 may be transferred and the maximum stitchable area of the said transferrable machines are registered.

Then, S12 awaits any key entry and goes to S13 when it receives one. This step discriminates whether or not the entered key is the picture change key and if so the step proceeds to S50 in which picture change routine is carried out whereas if not the step proceeds to S30 in which pattern select routine is performed. These routines will be described in detail in reference to the flow charts shown in FIG. 11 and FIG. 10, respectively.

After completing one of these routines, the step goes to S14 which discriminates if one series of stitch control data for producing a desired embroidery pattern combination has been registered and stored in memory 62, and if yes the program ;s over. If not, the step returns to S12.

Figure 9:
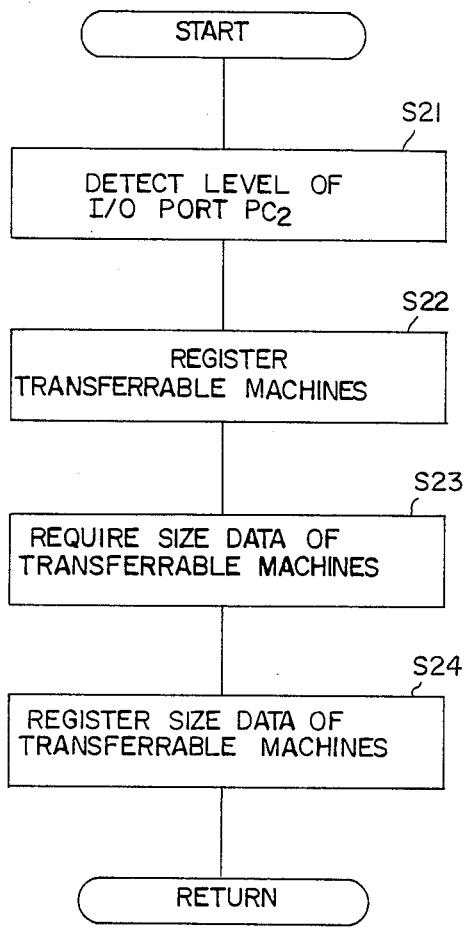
FIG. 9 is a flow chart illustrating a sub-routine for registration of transferrable machines.

Referring now to FIG. 9, the embroidering machine registration routine in S20 is described in detail. This routine starts with S21 for detecting that the port $PC_2$, of I/O interfaces 72, 74, 76, . . . and 82 of control unit 50 is at "H" level which means that embroidering machine 10 is connected via cable 100 to the said I/O interfaces on condition that control unit is duly powered (S10). Thus, then in S22, the embroidering machine 10 connected to the I/O interface is registered as a transferrable one to which the stitch control data can be transferred from memory 62 in control unit 50. If the port $PC_2$ of I/O interface is at "L" level, the embroidering machine corresponding to said I/O interface is registered as a non-transferrable one. Then in S23, control unit 50 requires each transferrable embroidering machine 10 to send size data regarding the maximum stitchable area thereof via line $L_5$ of I/O interface, which proceeds to S24 in which the size data of each transferrable machine is registered.

Figure 10:
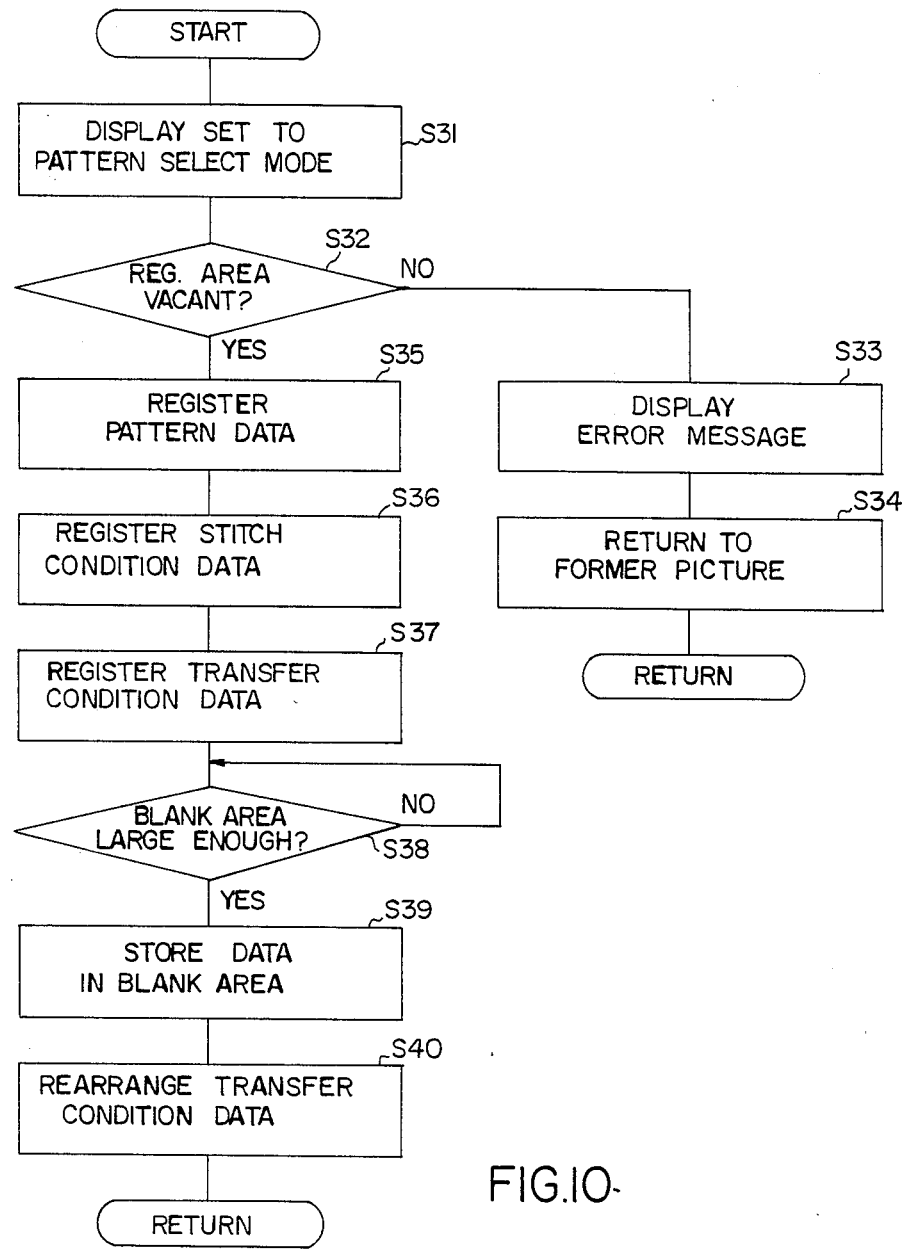
FIG. 10 is a flow chart illustrating another subroutine for registration of stitch control data.

The pattern select and registration routine in S30 will now be described in detail in reference to the flow chart in FIG. 10. This routine starts with S31 in which display 54 of control unit 50 is set to the pattern select mode in response to key entry other than the picture change key. Then in S32 if the registration area C (FIG. 7) is vacant is discriminated and responsive to the result thus obtained the procedure goes to S33 or S35. If the registration area C is not vacant, which means that the data precedingly registered in the registration area C have not yet been transferred to the blank area B, an error message of "NOT REGISTRABLE" is represented in display 54 for a predetermined period in S33 and then in S34 the display is returned to the former picture. After that, the procedure returns to the main routine in FIG. 8. On the contrary, if the registration area C is vacant enough to store the stitch control data, desired embroidery patterns are selected by manipulating keyboard 52 to designate code numbers peculiar thereto, followed by key entry of the stitch condition data regarding pattern arrangement, character size, character intervals and stitch pitches, for example, in S36. Then in S37, the transfer condition data is also selected by manipulation of keyboard 52. If the embroidering machines are not specified in S37, all of the embroidering machines having the registered size data capable of producing the embroidery pattern combination of a size thus designated will be automatically specified among the machines which have been registered as transferrable ones in the machine registration routine (S20).

The step proceeds to S38 for discriminating if the stitch control data comprising the pattern data, the stitch condition data and the transfer condition data each having thus been registered in the registration area C, can be stored in the blank area B. if the blank area B is so limited that the registered stitch control data can not be stored therein, the procedure remains standstill until some embroidering operation is completed so that the blank area B is enlarged enough. Thus in S39, the data registered in the registration area C is transferred to the blank area B and stored therein. Next in S40, the pattern size determined by the stitch control data thus stored in the blank area B is compared with the size data of each transferrable machine registered in S24 (FIG. 9), whereby if the former is larger than the latter, the transfer condition data included in the stitch control data is rearranged so as to assure that the stitch control data will not be transferred to the said embroidering machine. Then the procedure returns to the main routine. At this stage, the registered and stored data regarding the embroidery pattern combination, the stitch conditions and the transfer conditions are shown in display 54 for easier visual check by the operator. Thereafter, the stitch control data will be transferred to the respective transferrable embroidering machines in accordance with a timer interruption routine to be described later.

Figure 11:
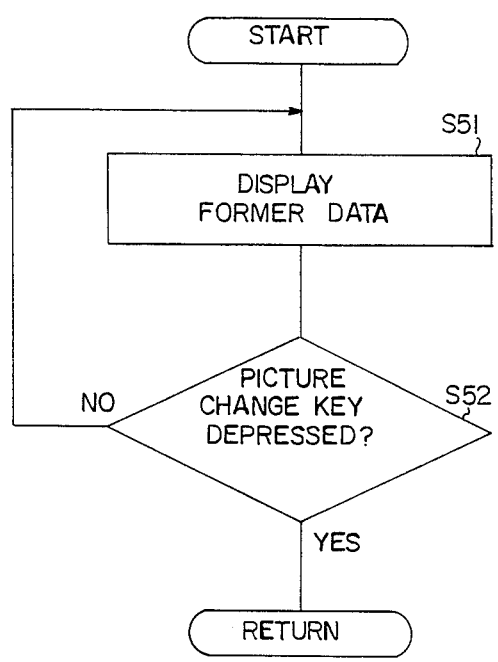
FIG. 11 is a flow chart illustrating another subroutine for picture change in a display in the control unit.

When S13 in FIG. 8 discriminates that the picture change key is depressed, as shown in FIG. 11, the picture change routine starts with S51 whereby the latest series of the stitch control data stored in the blank area B in memory 62 can be confirmed by a picture in display 54. Still the former data can be represented by depression of a scrawl key also arranged on keyboard 52. S52 discriminates if the picture change key is depressed once more, and if so display 54 is returned to the former picture and the procedure returns to the main routine.

Figure 12:
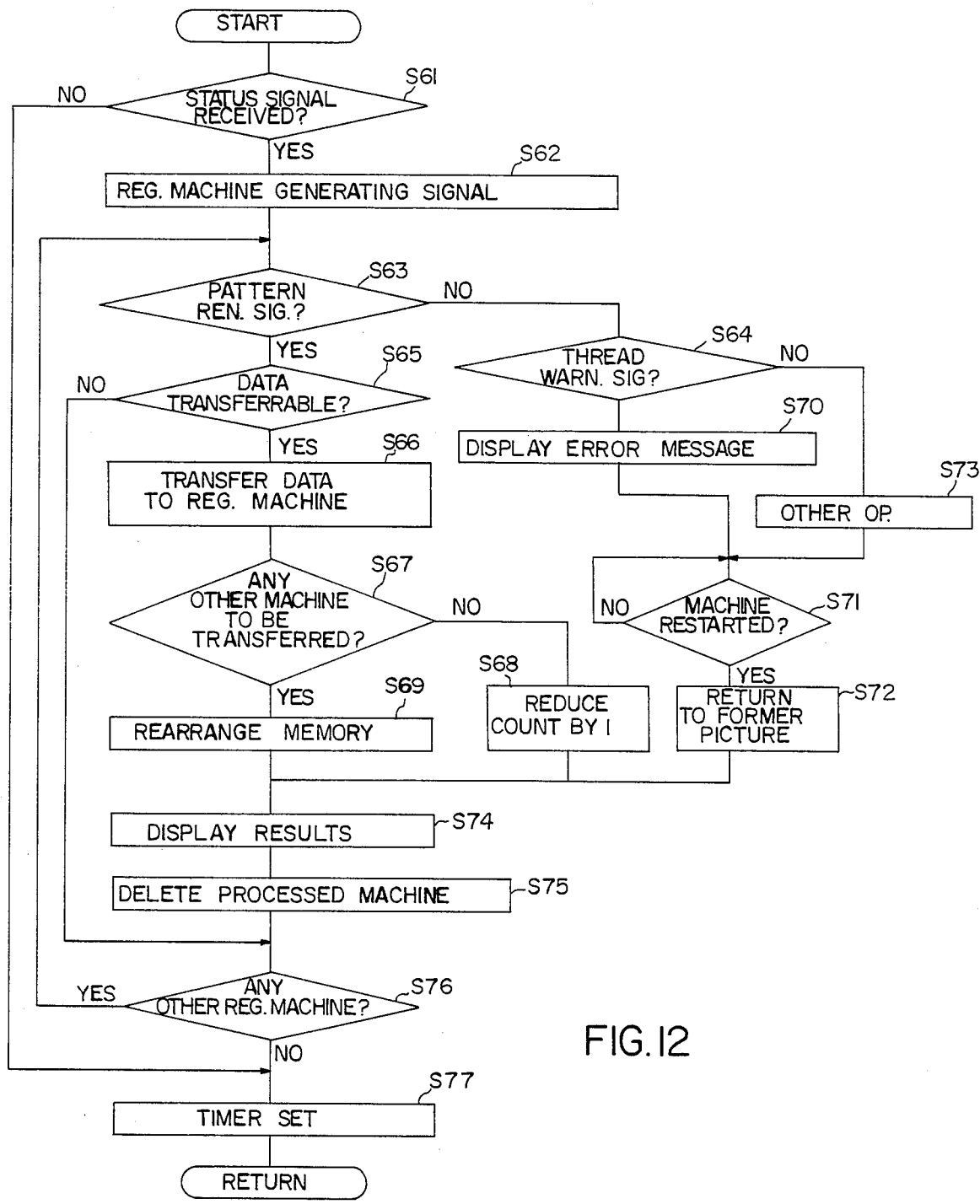
FIG. 12 is a flow chart illustrating a timer interruption sub-routine.

Now the timer interruption routine will be described in detail in reference to the flow chart in FIG. 12. This routine is automatically processed by control unit 50 in response to requirements from embroidering machine 10, without the operator's instructions. This means that once one or more series of the stitch control data for producing desired pattern combinations by plural embroidering machines have been stored in memory 62 in S14 in the main routine shown in FIG. 8, the operator may leave the control unit 50 and thereafter stay near the machine 10.

First, S61 discriminates if any status data is generated from one or more of embroidering machines 10 and received at ports $PA_0 \sim PA_3$ of I/O interfaces 72, 74, 76, ... 86. If not, the procedure is skipped to S77 in which a clock data of 10 ms is set to a timer so that the procedure is interrupted at every interval of 10 ms, then returns to the main routine. If any status data is received, the embroidering machine or machines from which the status data is supplied are registered in S62. Next in S63 and S64, as to the first registered machine, it is discriminated what kind of status data is supplied therefrom. When the operator operates the pattern renewal key on keyboard 16 so that the pattern renewal signal is generated from the first registered machine, the procedure is advanced to S65 for discriminating if the first registered machine has been registered as a transferrable one to which some series of the stitch control data stored in the blank area B in memory 62 can be transferred thereto. If so, the said stitch control data is now transferred to memory 22 in the first registered machine via signal line $L_6$ (FIG. 4) in S66. The next S67 discriminates if the said stitch control data should be transferred to an embroidering machine other than the first registered machine, which can be detected in reference to the transfer condition data thereof. If the said stitch control data designate another machine to be transferred, in S68, the count regarding the number of times of data transfer is reduced by one, then goes to S74. If, in turn, transfer of the said stitch control data is over that which can be realized by the count of zero, in S69, the said stitch control data is deleted from the memory area A in memory 62 which is thus rearranged to enlarge the blank area B in a manner as described hereinbefore in reference to FIG. 7.

When the status signal supplied concerns the upper thread break warning, the procedure goes through S63 and S64 to S70 which directs that the said situation be represented in display 54 of control unit 50 and at the same time actuates a warning buzzer. This warning representation remains until the said embroidering machine restarts which can be detected by signal levels at I/O interfaces in S71. Thereafter, display 54 returns to the former picture in S72.

S73 carries out necessary operation and display control when the status signal supplied will notify machine condition other than the pattern renewal and the upper thread breakage. For example, if the embroidery patterns actually produced on the fabric are out of order or deformed in which case the operator will not depress the pattern renewal key, automatic or manual repairing oPeration can be performed in S73. After completing the operation, the process goes to S71.

The results of operation performed are represented in display 54 in S74. Then, the first embroidering machine which has been processed through S63 to S74 will be deleted from registration in S75. If there is another machine registered in S62, it is discriminated in S76 which returns to S63. After all the registered machines have been processed in such manner, the process goes to S77.

Although the invention has been described in conjunction with a specific embodiment thereof, it is to be understood that many variations and modifications may be made without departing from spirits and scopes of the invention as defined in the appended claims.

What is claimed is:

1. An embroidering system comprising a plurality of embroidering machines, a control unit and coupling means for electrically connecting said embroidering machines and said control unit and providing signal transmission lines therebetween;

each of said embroidering machines comprising (i) a stitch forming mechanism including a needle, first drive means for vertically reciprocating said needle, workpiece supporting means for supporting a workpiece on a machine deck and second drive means for shifting said workpiece supporting means in relation to said needle to regulate a needle dropping point in the workpiece; (ii) first control means; (iii) first memory means adapted to store data required for producing an embroidery pattern combination under specific stitch conditions; (iv) first manual operating means operated to read data stored in said first memory means under control by said first control means, thereby actuating said first and second drive means to produce the embroidery pattern combination on the workpiece; and (v) means for generating a pattern renewal signal when one embroidery pattern combination has been produced by the machine;

said control unit comprising (vi) second control means; (vii) second memory means in which a plurality of stitchable embroidery patterns are stored in advance as pattern data; (viii) second manual operating means operated to designate a series of stitch control data necessary for producing a desired embroidery pattern combination; (ix) third memory means adapted to store plural series of the stitch control data designated by said second manual operating means, each series of the stitch control data comprising the pattern data designating the respective patterns in the pattern combination, stitch condition data designating conditions on which the pattern combination is produced on the workpiece and transfer condition data designating the embroidering machine or machines to be driven to produce the pattern combination; and (x) said second control means in said control unit being operated in response to the pattern renewal signal supplied from a specific embroidery machine to read out a specific series of the stitch control data stored in said third memory means, including the transfer condition data designating said specific embroidering machine, and transfer the said stitch control data to said first memory in said specific embroidering machine 2. The embroidering system according to claim 1 wherein said control unit further comprises first registration means for registering one or more of said embroidering machines which is actually powered and connected to said control unit as transferrable machine or machines, and said second control means is operated such that data is not transferred to an embroidering machine which has not been registered as a transferrable one by said first registration means even if the pattern renewal signal is generated from said embroidering machine.

3. The embroidering system according to claim 2 wherein said control unit further comprises second registration means for registering size data of each embroidering machine which has been registered as a transferrable one by said first registration means, said size data representing the maximum area stitchable by said machine, and said second control means is operated such that data is not transferred to the embroidering machine which has been registered by said second registration means to have the size data smaller than a size determined by the stitch condition data included in the stitch control data to be transferred.

4. The embroidering system according to claim 1 wherein said first and second control unit is integrated into a singla control unit which is mounted in one of said embroidering machines.

* * * * *